Feb. 26, 1963  A. NOVELLI ETAL  3,078,846
UNDERWATER BREATHING APPARATUS
Filed Oct. 4, 1960  8 Sheets-Sheet 1

INVENTORS
Alberto Novelli
& Pietro Buggiani
BY
Stevens, Davis, Miller & Mosher
ATTORNEYS Feb. 26, 1963  A. NOVELLI ETAL  3,078,846
UNDERWATER BREATHING APPARATUS
Filed Oct. 4, 1960  8 Sheets-Sheet 3

INVENTORS
Alberto Novelli
& Pietro Buggiani

BY Stevens, Davis, Miller & Mosher
ATTORNEYS

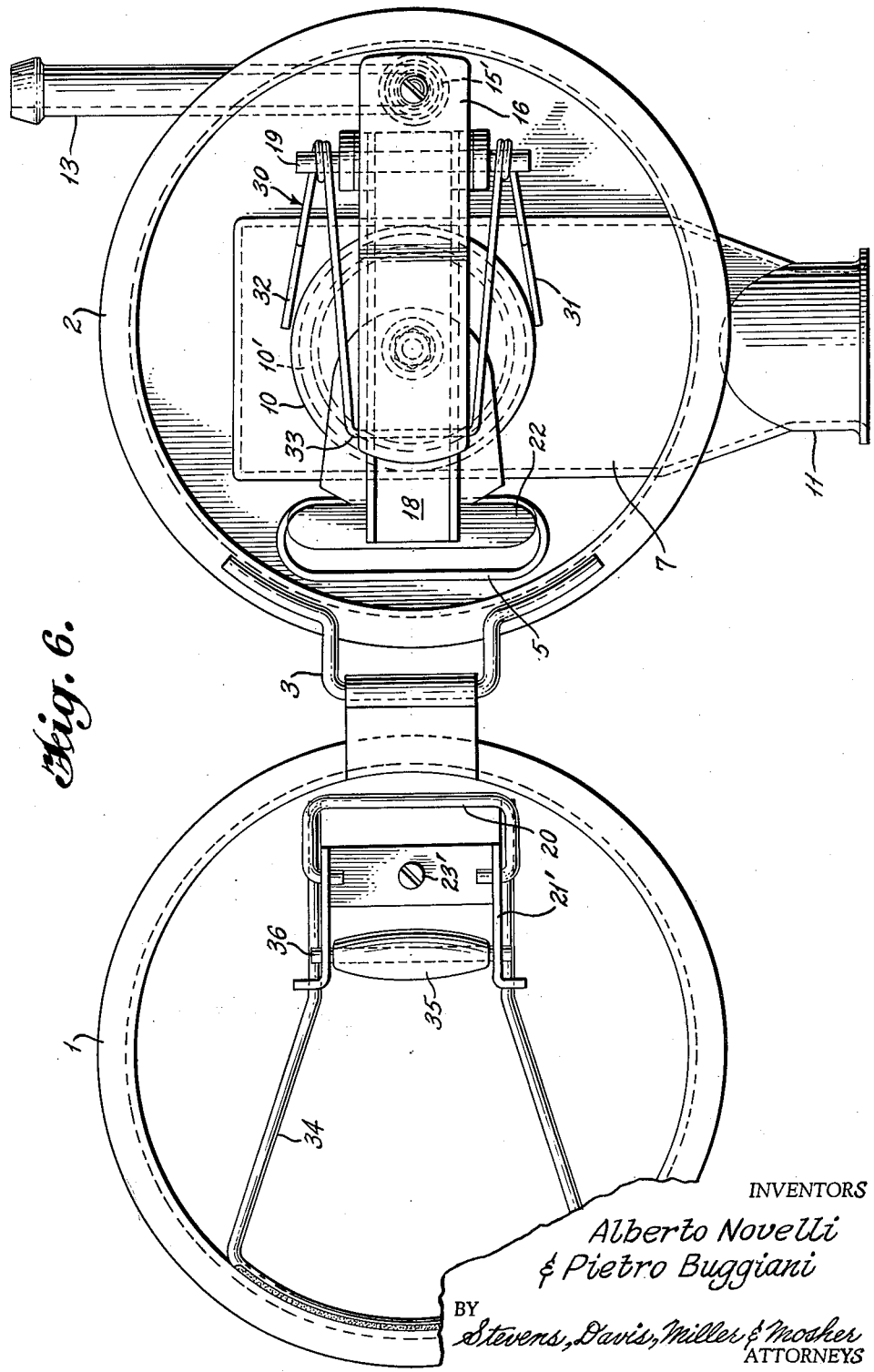

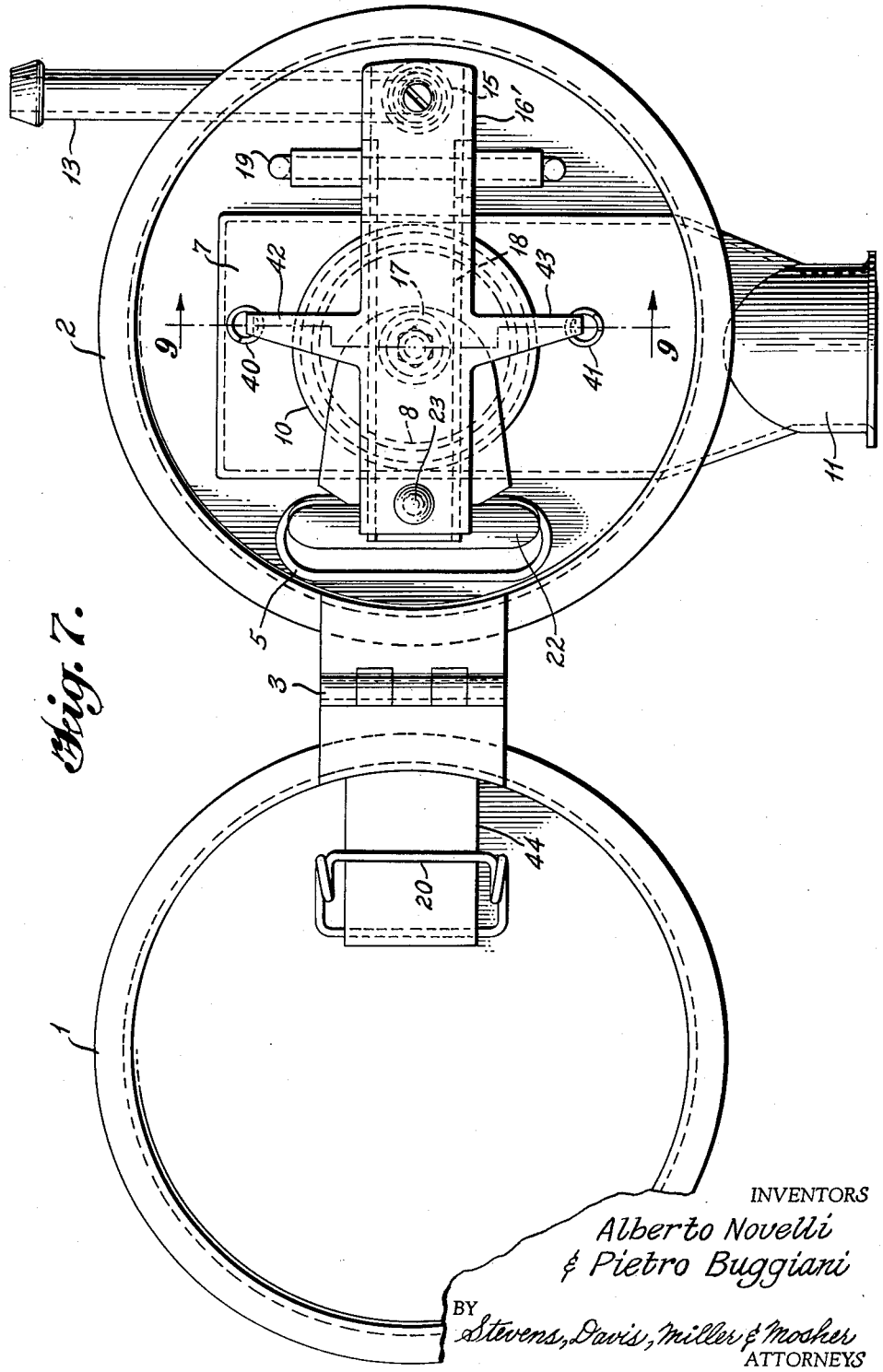

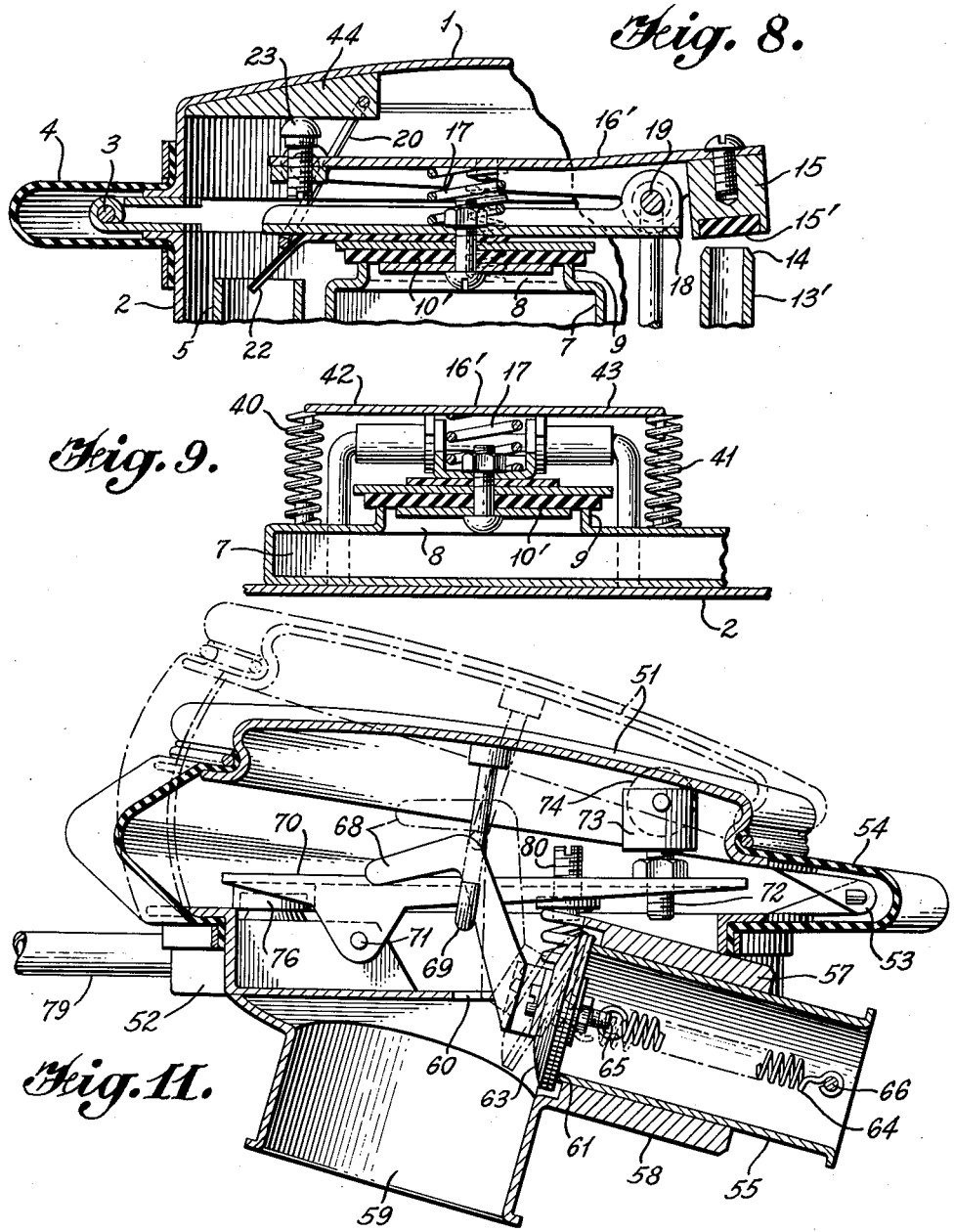

Feb. 26, 1963   A. NOVELLI ETAL   3,078,846
UNDERWATER BREATHING APPARATUS
Filed Oct. 4, 1960   8 Sheets-Sheet 7
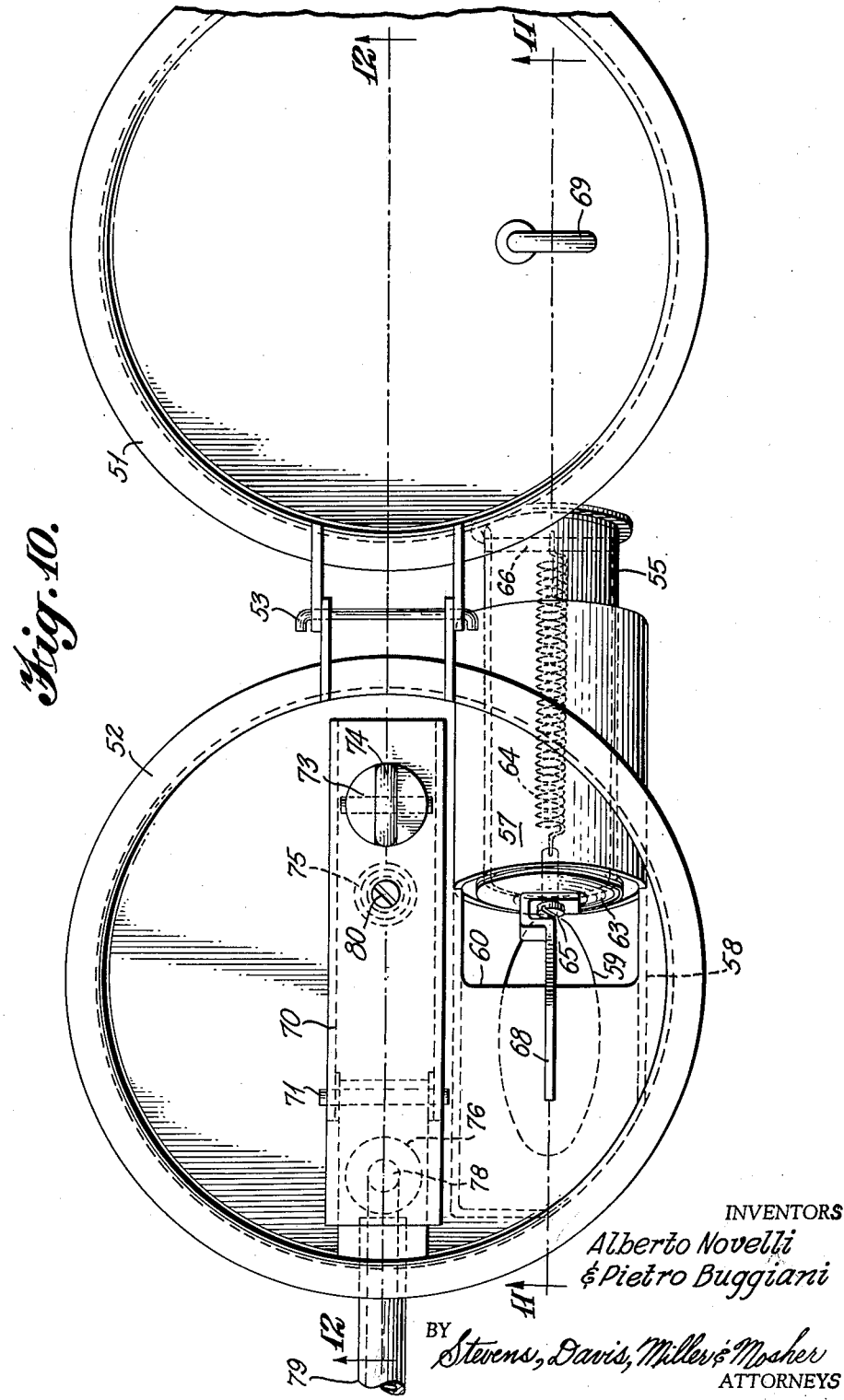
INVENTORS
Alberto Novelli
& Pietro Buggiani
BY Stevens, Davis, Miller & Mosher
ATTORNEYS Feb. 26, 1963   A. NOVELLI ETAL   3,078,846
UNDERWATER BREATHING APPARATUS
Filed Oct. 4, 1960   8 Sheets-Sheet 8

INVENTORS
Alberto Novelli
& Pietro Buggiani
BY Stevens, Davis, Miller & Mosher
ATTORNEYS

United States Patent Office 3,078,846
Patented Feb. 26, 1963

3,078,846
UNDERWATER BREATHING APPARATUS
Alberto Novelli, Via Agnano S. Gennaro 46, Pozzuoli, Naples, Italy, and Pietro Buggiani, Via Coroglio 82b, Bagnoli, Naples, Italy
Filed Oct. 4, 1960, Ser. No. 60,381
Claims priority, application Italy Oct. 10, 1959
9 Claims. (Cl. 128—142)

The present invention relates to underwater breathing apparatus wherein the inlet and exhaust valves are automatically controlled. More specifically, the present invention relates to an underwater breathing apparatus, hereinafter referred to as a "lung-box," wherein the inlet and exhaust valves are both enclosed within the same lung-box.

Lung boxes per se are known in the art. It is also known to provide these lung boxes with automatically controlled inlet valves and, further, with calibrated automatically controlled exhaust valves. These lung boxes generally comprise two plates or discs of rigid material superimposed on each other and preferably connected by a hinge, which permits movement of one disc relative to the other. The two discs are generally connected by means of a flexible diaphragm which serves to make gastight the space enclosed between the two discs. The gas exhaled and the gas to be inhaled pass alternately through such a lung box.

During the breathing cycle, particularly in the exhalation phase, a first amount of exhaled gas (which is retained in the lung box), due to the resulting increase in pressure in the lung box, causes the movable plate to pivot relative to the stationary plate and, thus causes an expansion of the lung box itself. After a predetermined expansion of the lung box, suitable means responsive to the movement of one plate relative to the other will open an exhaust valve, so that any gas subsequently exhaled will be expelled. The device referred to above also includes an inlet valve which remains in the closed position during the exhalation phase.

During the following inhalation phase, the gas retained in the lung box is inhaled and the consequent reduction of pressure in the lung box causes the movable plate to pivot towards the stationary plate. During this last mentioned movement, the exhaust valve becomes closed and remains closed during the rest of the inhalation phase. Other suitable means responsive to the movement of one plate towards the other will open the inlet valve to permit the introduction of fresh gas to be inhaled.

It is recognized that the first amount of gas exhaled will have a lower content of carbon-dioxide and a higher content of oxygen than will be the case in regard to the gas subsequently exhaled during the same exhalation phase. Also, the gas first expelled during an exhalation phase generally has a composition which is still capable of use in the breathing function. In this manner, the lung box, in a given inhalation phase, permits the re-utilization of the first amount of gas which was exhaled during the previous exhalation phase and which was retained as such in the lung box.

In the prior art lung boxes of the type referred to above, the lung box was generally of large size, in order to make it suitable for the function described above. Also, such a lung box was generally strapped to the chest of the user, thus involving the necessity of providing a communication between the lung box and the mouth piece by means of a corrugated hose, for example, which would have to have sufficient length to ensure a certain feredom of movement of the user.

Furthermore, lung boxes of the type referred to above, incorporated therein only the inlet valve; the outlet valve was situated on or adjacent the mouth piece and was controlled by the movement of the lung box through a Bowden connection having a considerable length.

The prior lung boxes referred to above required a large amount of space and the various parts were sufficiently distant relative to one another as to constitute a limitation upon the efficient performance of the device itself. Furthermore, in certain instances the corrugated hose for the connection between the lung box and the mouth piece, due to its considerable length has proven troublesome during the underwater movement of the user, particularly during the exploration of wrecks.

From the above it should be apparent that it would be desirable to have the various parts of the underwater breathing device of this type closely related to one another in terms of space. Therefore, it is a principal object of the present invention to provide a lung box of variable volume, wherein both the inlet and exhaust valves, together with the means for their control, are enclosed within the lung box. Such a lung box should have a minimum volume just sufficient to contain all of these elements.

A further object of the present invention is to provide a direct and integral connection between the mouth piece and the lung box, thus avoiding the corrugated hose required in the prior art devices.

A further object of the present invention is to provide within the lung box a means of isolating the first amount of exhaled gas retained within the lung box from that which is expelled thereafter.

A further object of the present invention is to simplify the valve control means.

Other and further objects and advantageous features of the present invention will hereinafter more fully appear in connection with a detailed description of the drawings in which FIGURE 1 is a diametral cross-section of an embodiment of the lung box of the present invention, showing the lung box in its position of minimum volume;

FIGURE 6 is a fragmentary plan view, with the diaphragm removed, of the lung box shown in FIGURE 5, where the two plates have been opened to a coplanar position;

FIGURE 7 is a view similar to FIGURE 6 showing a further modification of the persent invention;

FIGURE 8 is a fragmentary diametral cross-sectional view, similar to FIGURE 1, showing further details of the lung box illustrated in FIGURE 7;

FIGURE 9 is a cross-sectional view taken along section line 9—9 of FIGURE 7, showing details of the auxiliary spring system;

FIGURE 10 is a plan view similar to FIGURE 7 showing a still further embodiment of the present invention;

FIGURE 11 is a cross-sectional view taken along section line 11—11 of FIGURE 10 showing details of the mouth piece and exhaust valve.

Figure 1:
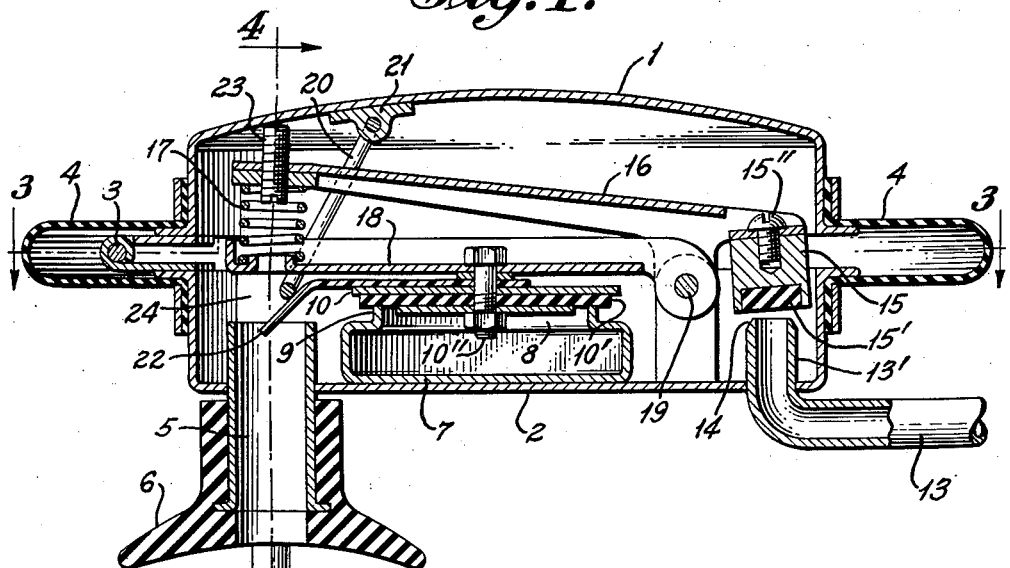
Figure 2:
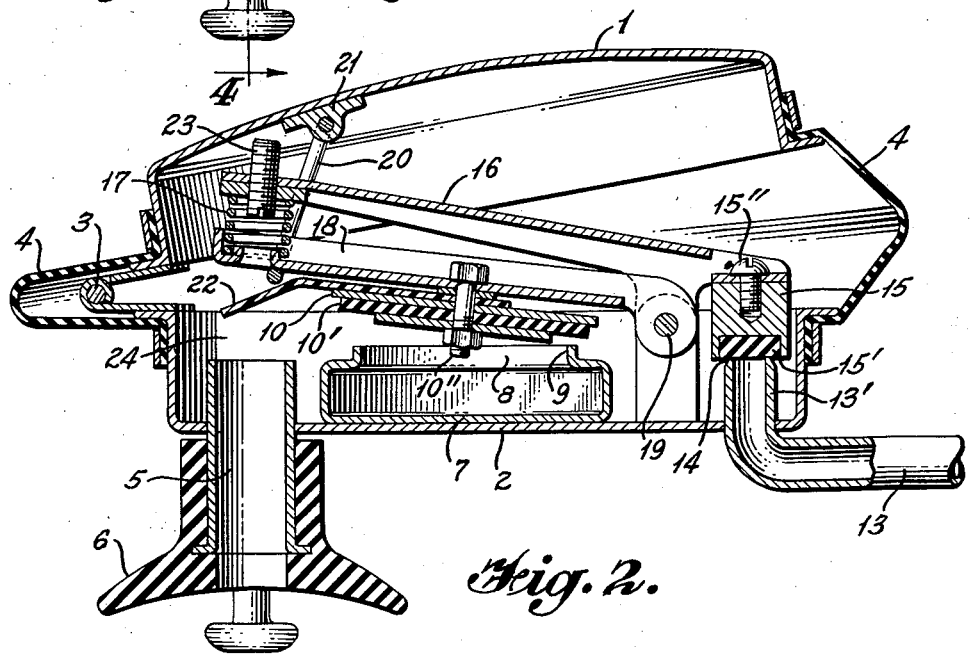
FIGURE 2 is a view similar to FIGURE 1 showing, however, the same lung box in its position of maximum volume.
Figure 3:
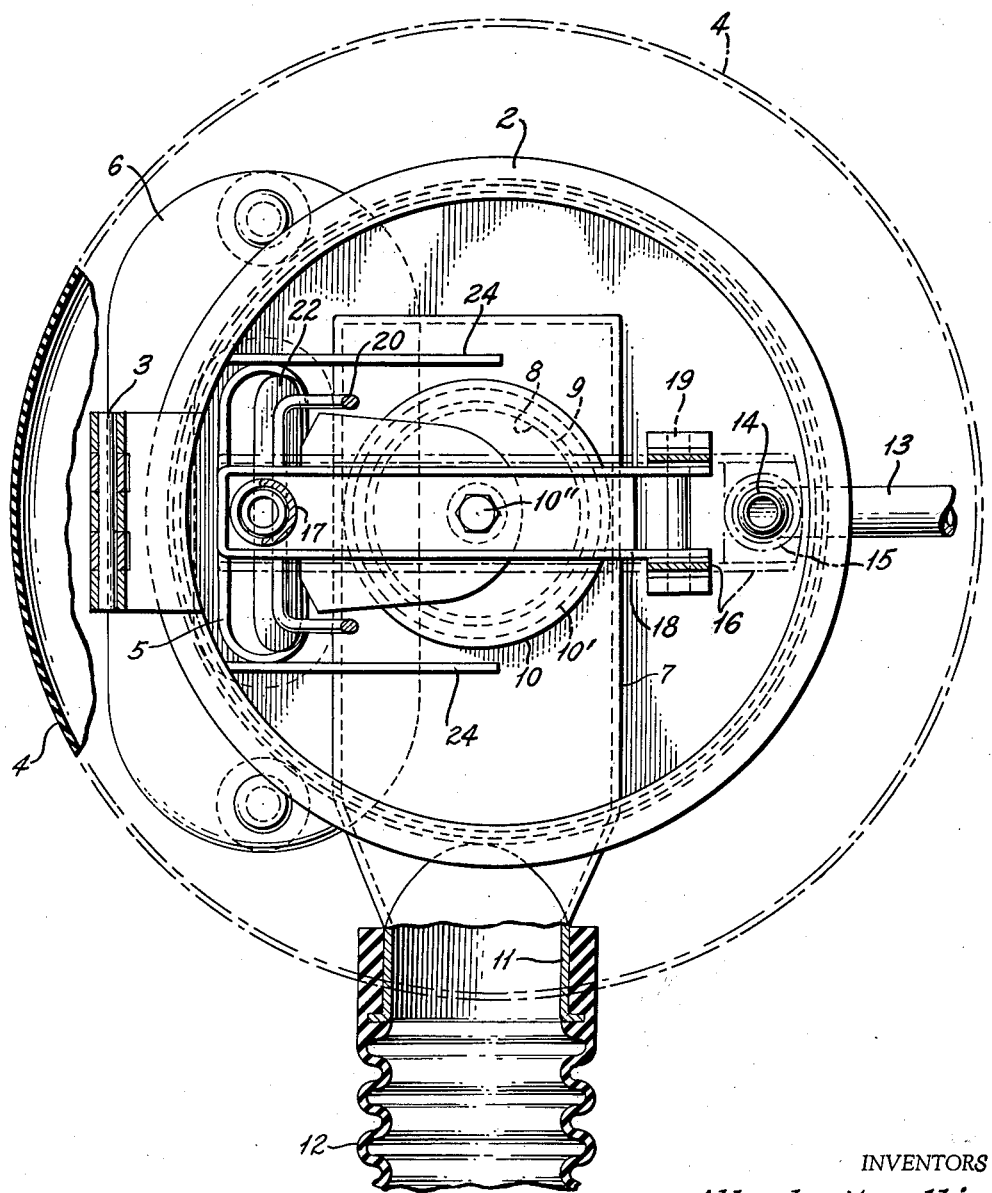
FIGURE 3 is a sectional view taken along section line 3—3 of FIGURE 1, showing principally the details of the lower stationary plate and its associated elements.
Figure 4:
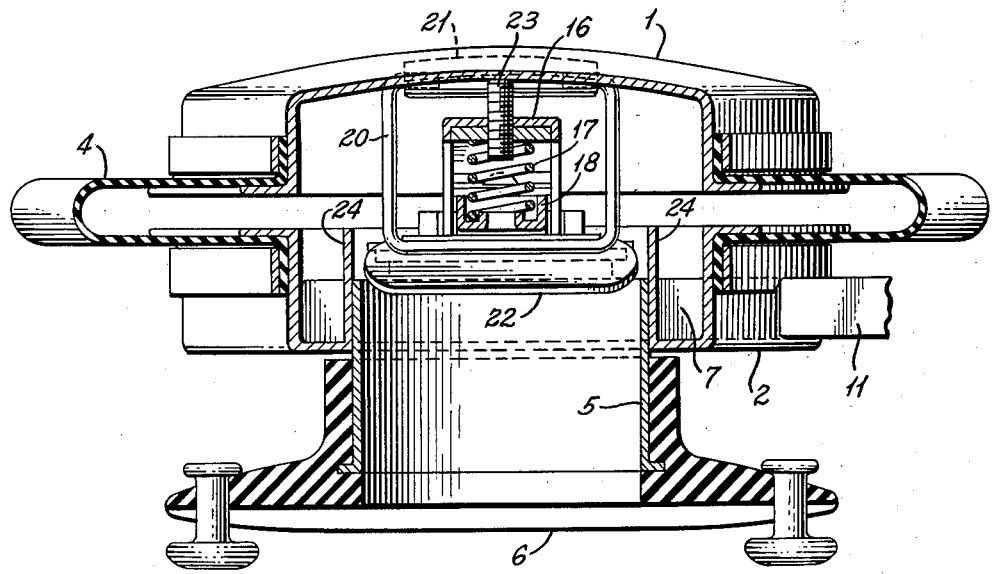
FIGURE 4 is a transverse section taken along section line 4—4 of FIGURE 1, showing further details of the mouth piece and associated elements.

Referring to the drawings in detail, FIGURES 1 to 4 show a variable volume chamber, hereinafter referred to as a "lung box," comprising a pair of plates 1 and 2, preferably circular, made of a rigid material (generally metal) and hinged together by means of a hinge 3. The plates are dished or recessed, with their concavities facing one another, so as to form a hollow enclosure between them. A diaphragm 4 of the bellows type, made of a flexible material which is both water-tight and gas-tight, is secured along the circumferences of both plates thereby limiting and rendering fluid-tight the space enclosed between the two plates; however, as shown in FIGURE 2 for example, the diaphragm 4 still permits a limited degree of freedom of movement between the plates.

As indicated above, the lung box formed by the plates 1 and 2 is of a variable volume and the latter is effected by the relative movement between the plates as permitted by the hinge 3. For the sake of convenience, plate 1 will be referred to hereinafter as the "movable" plate and plate 2 as the "stationary" plate.

A short metallic connection, or tube, 5 passes through the plate 2, preferably near the hinge 3. A rubber mouth piece 6, of essentially standard configuration, is secured to the outer end of the connection 5.

Mounted on the inner face of the plate 2 is an enclosed and hollow exhaust chamber 7 which is provided with a circular hole 8 on the interior side of the chamber. The hole 8 is defined by a vertically projecting edge 9 which, as will be explained hereinafter, serves as the seat for an exhaust valve constituted by a small plate 10 and a gasket 10'. The exhaust chamber 7 extends laterally outward from the stationary plate 2 through a duct 11. On the end of the duct 11 is secured a corrugated rubber hose 12 of a type known per se (only the initial part of which is shown) which terminates in an issue valve (not shown), such as of the "duck beak" type; the corrugated rubber hose will assume a vertical attitude towards the floating position of the duck beak valve.

An inlet duct 13, shaped in the form of an elbow and having a short arm 13', passes through a suitable hole in the plate 2, preferably in a position opposite to the hinge 3. The upper edge 14 (or orifice) of the short arm 13' serves as a seat for the inlet valve constituted by the small socket 15 and the gasket 15' which is mounted within the socket. The outer end of the duct 13 is connected with a source of air or other respiratory gas coming from a cylinder or any other suitable source (not shown).

The socket 15, including its gasket 15', is fastened, by means of a pin 15", to one arm of a lever 16 which is pivotally mounted on the fulcrum 19. The other end of the lever 16 carries a threaded screw 23 which, as shown in FIGURE 1, is adapted to bear against the inner surface of the plate 1. The upper end of a spring 17 bears against the lever 16 in a position beneath the screw 23. The lower end of the spring 17 bears against one end of a lever 18 which is also pivoted at the fulcrum 19 in common with the lever 16. The exhaust valve constituted by the small plate 10 and the gasket 10' are secured adjacent the middle of the lever 18 by means of the pin 10".

The above described exhaust valve is also provided with a flipper 22 of elastic material having a sufficient width to cover over the opening of the tube 5. The flipper 22 is also secured to the lever 18 by means of the pin 10".

The plate 1 is provided with a stirrup 20 which is connected to this plate by means of the support 21. The lower loop of stirrup 20 passes below the bottom of lever 18. The stirrup is of a predetermined length and, of course, is movable together with the movable plate 1. This length of the stirrup is such that, when the plate 1 moves outwardly relative to plate 2 during an exhalation stage, the stirrup, or the lower loop thereof, after a predetermined lift will bear against the end of the lower lever 18 causing the spring 17 to compress and thus urging the gasket 15' against the opening 14 on the inlet duct 13. This latter condition is essentially shown in FIGURE 2 and, in this figure, it should be apparent that the inlet duct 13 is now closed. As shown in FIGURE 1, the length of the stirrup 20 is also such that, when the plate 1 moves towards plate 2 during an inhalation stage, the lower loop of the stirrup will bear against the flipper 22 so as to bend the latter and uncover, at least partially, the opening in the tube 5.

Two metal strips 24 are disposed at the sides of the connection 5; these strips have a height substantially equal to the complete stroke of the exhaust valve as well as of the attached flipper 22.

The operation of the apparatus shown in FIGURES 1–4 will now be described in connection with an inhalation stage and a subsequent exhalation stage. It should be pointed out, first of all, that there is a rest position between the inhalation and exhalation phases, and vice versa, which can be sustained indefinitely and during which both the inlet and the exhaust valves remain closed, as will become evident from the following description.

It will be assumed that the user wishes to commence inhaling gases from the lung box. As the user inhales gases from the lung box, the gas pressure therein will diminish so that the plate 1 approaches the plate 2, continuing until it reaches the position of maximum approach illustrated in FIGURE 1.

During the approach of the plate 1 towards the plate 2, the inner surface of the plate 1 will bear against the screw 23 so as to pivot the upper lever 16 about its fulcrum 19, thereby raising the socket 15 and gasket 15' from the orifice 14 of the delivery duct 13. Thus, the respiratory gas, which is under pressure, will now be permitted to enter the lung box. Also, during the lowering, or approach, of the plate 1 towards the plate 2, the stirrup 20 will disengage from the lower end of the lever 18 and will bend the end of the flipper 22 to the position shown in FIGURE 1. The lowering of the left-hand end of the lever 16 will also cause the lowering of the left-hand end of the lever 18 through the medium of the spring 17. Thus, the outlet valve constituted by the small plate 10 and the gasket 10' will, under these circumstances, be further forced to bear against the edge 9 and thus cut off the outflow of gases from the lung box. If inhalation is continued, the relative positions of the various elements heretofore described will remain in the position shown in FIGURE 1 during which time the exhaust valve is closed and the inlet valve is open so that fresh air is introduced into the lung box.

Referring again to FIGURE 1, it will be assumed that the inhalation phase has been completed and that there is a slight pause before the beginning of the expiration phase. Under these conditions, the user is no longer withdrawing gases from the lung box and therefore the gases coming in through the duct 13 will cause the plate 1 to move upwardly with respect to the plate 2. As the plate 1 moves slightly upwardly relative to the plate 2, the screw 23, bearing against the inner surface of the plate 1, moves therewith, but the spring 17 is permitted to expand until gasket 15' seats against the orifice 14. When the latter condition is reached no further quantity of fresh gas is introduced into the lung box and both the valves remain in the closed position.

Assuming that the user begins to exhale, commencing from the position shown in FIGURE 1 or from the position of rest described above, the movable plate 1 will commence to move outwardly away from the plate 2, thereby causing the lower loop of the stirrup 20, after a predetermined lifting to contact and to bear against the underside of lever 18, thus opening the outlet valve as shown in FIGURE 2. The compression of the spring 17 under the latter condition will still maintain the inlet valve in the closed position shown in this figure. The flipper 22 is now free to move laterally outward so as to cover the opening in the tube 5.

At the end of the exhalation phase, the movable plate 1 approaches the plate 2 until it bears against the screw 23 and the outlet valve closes, the inlet valve meanwhile remaining closed. This movement takes place in the rest period between the inhalation phase and the exhalation phase.

Figure 5:
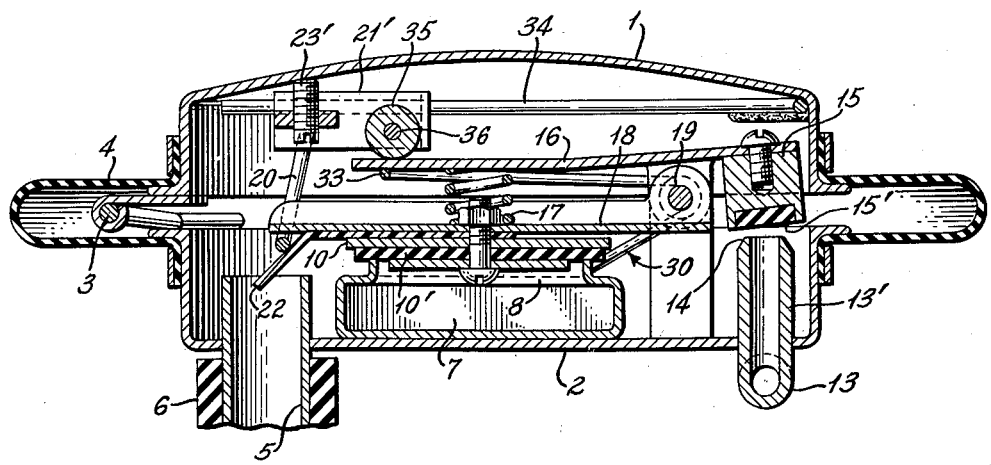
FIGURE 5 is a view similar to FIGURE 1 showing another modification of the lung box constructed in accordance with the present invention.

FIGURES 5 and 6 illustrate another form of lung box which is similar to that shown in FIGURES 1–4. Although this lung box has an operating cycle substantially identical to the one described above, it distinguishes in that a system of two springs is employed to act upon the two levers. One of these springs is operative on both levers, the other spring being operative on one lever only, preferably on the lever which operates the inlet valve.

Referring particularly to FIGURES 5 and 6, similar parts bear the same reference numerals as are employed in conjunction with FIGURES 1–4 inclusive. In addition to the spring 17 which is supported between the levers 16 and 18 in substantially the same manner as described above in reference to FIGURES 1–4 (although the position of the spring 17 is admittedly closer to the fulcrum point), the embodiment shown in FIGURES 5 and 6 employ, in addition, a second spring 30 which is wound around the pin 19, the latter constituting the fulcrum for the levers 16 and 18. The lower arms 31 and 32 of the spring bear against the top of the exhaust chamber 7. The upper loop 33 of this spring bears against the underside of the upper lever 16 in such a manner as to urge the gasket 15' into its closed position relative to the inlet duct 13. Thus, the added spring 30 assists in maintaining the inlet valve closed at the proper time.

The plate 1 shown in FIGURES 5 and 6 is modified to the extent that the stirrup 20 is suspended from a support 21'. The support 21' is secured to one end of a filiform element 34 which is suitably attached to the inner periphery of the plate 1. The threaded screw 23' is now adjustably mounted in the support 21' instead of at the end of the lever 16, as in the case of FIGURES 1–4. The support 21' is also provided with a roller 35 which is rotatable on a small shaft 36. Thus, when the plate 1 is lowered towards the stationary plate 2 during an inhalation phase, the lever 16 will be contacted by the roller 35 instead of by the adjustable screw 23 (or 23'). The roller permits a moderate amount of sliding and thus decreases the friction effects. The position of the roller 35, however, may be raised or lowered relative to the plate 1 by turning the screw 23' in one direction or another. The action of the stirrup 20 relative to the lower lever 18 and the flipper 22 is otherwise the same as in connection with FIGURES 1–4.

The embodiment shown in FIGURES 7, 8 and 9 also operates in a manner similar to the embodiment shown in FIGURES 1–4, inclusive, and, as is in the case with respect to FIGURES 5 and 6, the embodiment of FIGURES 7 to 9 includes an additional spring force to facilitate the closure of the inlet valve. More specifically, two additional springs 40 and 41 are mounted beneath the ends of two lateral extensions 42 and 43 on the upper lever 16'. The lower ends of the two springs 40 and 41 bear against the upper surface of the exhaust chamber 7 and the upper ends of these two springs bear against the undersides of the extensions 42 and 43, respectively, as aforesaid. The spring 17 is mounted between the two levers 16' and 18 in substantially the same manner as described above with reference to FIGURES 5 and 6. The stirrup 20 is suspended from the plate 1 by means of the support 44. As in the case of FIGURES 1–4, the adjustable screw 23 is mounted on the outer (left-hand) end of the upper lever 16'. However, the adjustable screw will bear against the support 44 rather than against the plate 1 directly.

In the embodiments described above, in case of emergency, the user can press against the movable plate 1 so as to force the same towards the stationary plate 2 and thereby opening the inlet valve and permitting fresh air or other respiratory gas to enter the lung box for the required period of time.

Figure 12:
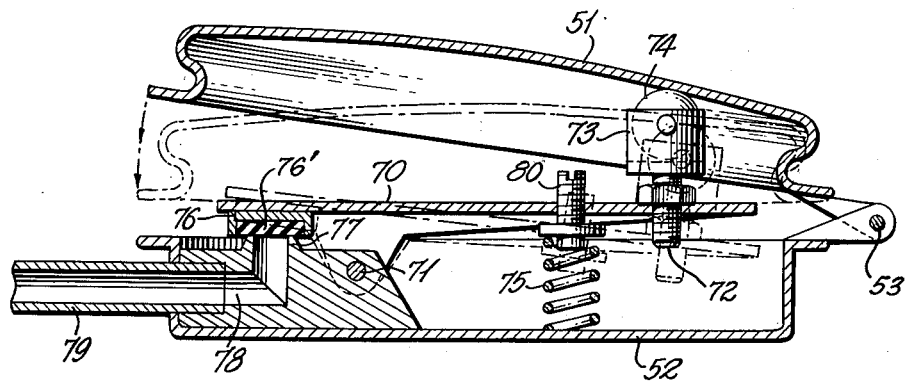
FIGURE 12 is a cross-sectional view taken along section line 12—12 of FIGURE 10 showing, in particular, details of the inlet valve and its operating means.

The embodiment shown in FIGURES 10–12 represents a lung box which is similar in many respects to those described above. More particularly, the lung box in these figures is comprised of two plates 51 and 52, the first of which will be considered as movable and the second of which will be considered as stationary. These two plates are hinged together by means of a hinge 53; and a diaphragm 54 of the bellows type is secured along the outer peripheral edges of the plates 51 and 52. The diaphragm 54 is essentially the same as the diaphragm 4 described above.

The stationary plate 52 is provided with a metallic tubular connection 55 which, by means of a corrugated tube (not shown), leads to an issue valve (not shown), preferably of the "duck beak" type. The longitudinal axis of the tubular element 55 forms an acute angle with the plane of the plate 52 in such a manner that a portion 57 of the connection 55 partially passes through the plate 52 while the remaining part 58 is chamfer-sealed into the plate 52.

A metallic connection 59 for the mouth piece (not shown) is connected at right angles to the part 58 of the metallic connection 55. This connection 59 has an elliptical section and occupies the right-hand portion of the part 58, as best shown in FIGURE 11.

The plate 52 is provided with an opening 60 which is smaller than the opening in the connection 59. The inner end 61 of the tubular element 55 serves as a seat for the metallic disc 63 which is urged into the solid line position shown in FIGURE 11 by means of a spring 64. The spring 64 is connected, on the end, to the disc 63 by means of the lug 65 which is secured to the lower face of the disc 63; the other end of spring 64 is connected to a transverse rod 66 which is fastened to the inside of the tube 55. An angular hook 68 is attached to the upper (left-hand) face of the valve or disc 63. This angular hook 68 is designed to engage, at a predetermined moment, with a curved hook 69 which is secured to the inner surface of the movable plate 51. Thus, the tube 55 and the disc 63 together constitute the exhaust valve. As will hereinafter appear, the angular hook 68 and the curved hook 69 constitute the means for operating this exhaust valve.

As best shown in FIGURES 10 and 12, the means for controlling the inlet valve comprises a lever 70 disposed along a diameter of the plate 52 and pivotally connected thereto at the fulcrum 71. As best shown in FIGURE 11, the lever 70 carries at its right-hand end, a threaded screw 72 upon the upper end of which is mounted the small support 73. A small wheel 74 is suitably journaled in the support 73. The position of the wheel and support can be adjusted by means of the screw 72.

An expansion spring 75 is mounted within the lung box in such a manner that the upper end thereof acts against the lower surface of the lever 70; the lower end of the spring rests against the inner bottom surface of the plate 52. The screw 80 (with collar attached) mounted in the lever 70 serves to adjust the tension of the spring 75.

As best shown in FIGURE 12, the left-hand end of the lever 70 is provided, on its lower surface, with a metallic disc 76 having therein a rubber gasket 76′ which is adapted to seat on the orifice 77 of the small inlet chamber 78 provided in the lung box. The chamber 78 connects with a metallic connection 79 which, in turn, is attached to a suitable hose (not shown) leading to a cylinder containing fresh air or other respiratory gases.

The operation of the lung box in FIGURES 10 to 12 will now be described in connection with an exhalation phase and a subsequent inhalation phase.

Starting from the solid line position shown in FIGURE 11, which represents the rest position of the lung box, it will be assumed that an inhalation phase has just been completed and that the expulsion phase is about to commence. As the gases are introduced from the mouth piece (not shown) through the connection 59 and opening 60 into the lung box, the plate 51 will move outwardly relative to the plate 52 until it reaches its maximum position of expansion as shown by the dotted lines in the figure. During the movement of the plate 51 relative to the plate 52, the curved hook 69 will contact the angular hook 68, causing the disc or valve to pivot about the upper portion of the edge 61 against the action of the spring 64. At this point, the exhaust valve is open and any gases exhausted thereafter into the lung box will pass outwardly from the tube 55 through a suitable hose (not shown) and to an issue valve (not shown).

At the end of the expiration phase the lung box will contain those gases which were first exhaled and which contain a higher percentage of oxygen than the gases later expelled. Thus, in the beginning of the exhalation phase the user will draw, from the lung box, those gases which were first expelled during the previous exhalation phase. As these gases are withdrawn from the lung box the movable plate 51 will approach the stationary plate 52 until, in the solid line position shown in FIGURE 11, the exhaust valve will be completely closed. At this point, the small wheel has made its initial contact with the inner surface of the plate 51. As the inhalation phase continues, the plate 51 will further approach the stationary plate 52, and the action of the plate 51 against the wheel 74 will cause the lever 70 to pivot above its fulcrum and raise the gasket 76′ away from the orifice 70. At this time, the fresh gas connected to the conduit 79 will pass into the lung box for immediate consumption thereafter by the user.

At the end of the inhalation phase, the fresh gas will continue to pass through the lung box through the conduit 79 until the plate 51 raises sufficiently so that the spring 75 can close the gasket 76′ against the orifice 77, thus returning the lung box to the solid line position shown in FIGURE 11.

Whereas the present invention has been described, in all of its various embodiments, in particular relation to the drawings attached hereto, it should be understood that other and further embodiments might be made within the spirit and scope of this invention.

What is claimed is:

1. An underwater breathing apparatus comprising a lung box of variable volume, said lung box including two plates of rigid material pivotally connected to one another, a diaphragm connected to the edges of said plates and forming with said plates a fluid-tight enclosure, a mouth piece connected directly to said lung box and communicating directly with said enclosure, an inlet valve within and connected directly to said lung box and communicating directly with said enclosure, an outlet valve within and connected directly to said lung box and communicating directly with said enclosure, means responsive to the movement of one plate away from the other for first closing said inlet valve and upon continued movement of said one plate away from said other plate for opening said outlet valve thereafter, and means responsive to the movement of said one plate towards said other plate for first closing said outlet valve and upon continued movement of said one plate towards said other plate for thereafter opening said inlet valve.

2. An underwater breathing apparatus provided with a lung box comprising two plates of rigid material pivotally connected to each other and surrounded by a flexible diaphragm so as to form an enclosed space of variable volume, a mouth piece, a short metallic tube connecting from one of said plates to said mouth piece, an enclosed exhaust chamber mounted on said plate within said lung box and having therein a hole acting as a valve seat, a first lever pivotally mounted within said lung box and carrying at one end means engagable with said seat for covering said hole so as to constitute an exhaust valve, an exhaust conduit connected to said exhaust chamber and passing through said one plate for directing gases from said lung box when said exhaust valve is open, an inlet duct passing through said one plate and being provided with an orifice within said lung box communicating with said enclosed space, a second lever pivotally mounted within said lung box and carrying thereon a means engagable with said orifice for closing the same, said orifice and its engagable means constituting an inlet valve, means resiliently urging each lever in a direction to close its respective valve, means responsive to a predetermined movement of the other of said plates away from said one plate, and acting upon said first lever to open said exhaust valve, and means responsive to the movement of said other plate towards said one plate and acting upon said second lever to open said inlet valve.

3. An underwater breathing apparatus as set forth in claim 2 including an elastic flipper mounted within said lung box over the inner opening of said short metallic tube for directing gases passing inwardly through said tube towards said hole when said exhaust valve is open, said means for acting against said first lever comprising a stirrup mounted on said other plate and engagable beneath said first lever, said stirrup, when said other plate is moved toward said one plate, being engagable with said elastic flipper so as to bend the latter in such a manner as to free the inner opening of said short metallic tube.

4. An underwater breathing apparatus as set forth in claim 2 wherein said two levers are pivotally mounted on a common fulcrum and wherein said resilient means bearing against both levers is constituted by a single spring.

5. An underwater breathing apparatus as set forth in claim 2 wherein said two levers are pivotally mounted on a common fulcrum and said resilient means comprise a first spring mounted between said two levers urging both said levers towards their closed positions, and a second spring bearing against said second lever only for urging said second lever towards its closed position.

6. An underwater breathing apparatus as set forth in claim 5 including a third spring bearing against said second lever in the same manner as said second spring.

7. An underwater breathing apparatus as set forth in claim 2 wherein said exhaust conduit passes into said one plate at an acute angle and wherein said metallic tube is connected to said one plate at right angles to said exhaust conduit.

8. An underwater breathing apparatus as set forth in claim 7 wherein said means resiliently urging said second lever into its closed position comprises a spring mounted within said exhaust conduit, said spring being connected at one end with the means engagable with said seat and at its other end with said exhaust conduit.

9. An underwater breathing apparatus comprising a lung box of variable volume, said lung box including two plates of rigid material pivotally connected to one another, a diaphragm connected to the edges of said plates and forming with said plates a fluid-tight enclosure, a mouth piece connected directly to said lung box and communicating directly with said enclosure, an inlet valve within and connected directly to said lung box and communicating directly with said enclosure, an outlet valve within and connected directly to said lung box and communicating directly with said enclosure, means coacting with the movement of one plate away from the other during an expiration phase for maintaining closed said inlet valve in an enhanced state and for opening said outlet valve after a predetermined movement of said one plate away from said other plate, and means coacting with the movement of said one plate towards said other plate during an inspiration phase for maintaining closed said outlet valve in an enhanced state and for opening said inlet valve.

References Cited in the file of this patent

UNITED STATES PATENTS 2,944,544    Lundgren _____ July 12, 1960

FOREIGN PATENTS 1,175,640    France _____ Nov. 17, 1958
645,056    Germany _____ May 20, 1937